United States Patent [19]

Montenbruck

[11] 3,973,770
[45] Aug. 10, 1976

[54] PAPER CONVEYING SYSTEM
[76] Inventor: Stephen Montenbruck, 7774 Elm Grove Drive, Elmwood Park, Ill. 60635
[22] Filed: Apr. 16, 1975
[21] Appl. No.: 568,596

[52] U.S. Cl............................ 271/272; 271/193; 226/172
[51] Int. Cl.².............. B65H 5/02; B65H 29/12
[58] Field of Search............. 271/DIG. 3, DIG. 2, 271/18.1, 193, 264, 272, 273, 274, 275, 277; 198/41; 226/172

[56] References Cited
UNITED STATES PATENTS

| | | | |
|---|---|---|---|
| 1,561,063 | 11/1925 | Dunlap | 198/41 |
| 2,995,363 | 8/1961 | Pittwood | 271/272 |
| 3,428,308 | 2/1969 | Bernard | 271/193 |
| 3,635,128 | 1/1972 | Dohnalik | 271/2 |

FOREIGN PATENTS OR APPLICATIONS

| | | | |
|---|---|---|---|
| 1,241,647 | 6/1967 | Germany | 271/193 |
| 44-12937 | 6/1969 | Japan | 198/41 |

Primary Examiner—Evon C. Blunk
Assistant Examiner—Robert Saifer
Attorney, Agent, or Firm—Hill, Gross, Simpson, Van Santen, Steadman, Chiara & Simpson

[57] ABSTRACT

A paper conveying system, particularly adapted for use in conveying paper blanks through an envelope making machine by means of at least two parallel opposed endless strip conveyors which are formed of flexible permanent magnet material with both the north and south magnetic poles positioned on a common surface, the common surfaces of the strips being opposed whereby the strips are attracted to one another and will grip a paper blank therebetween. A magnetic roller is also disclosed.

9 Claims, 15 Drawing Figures

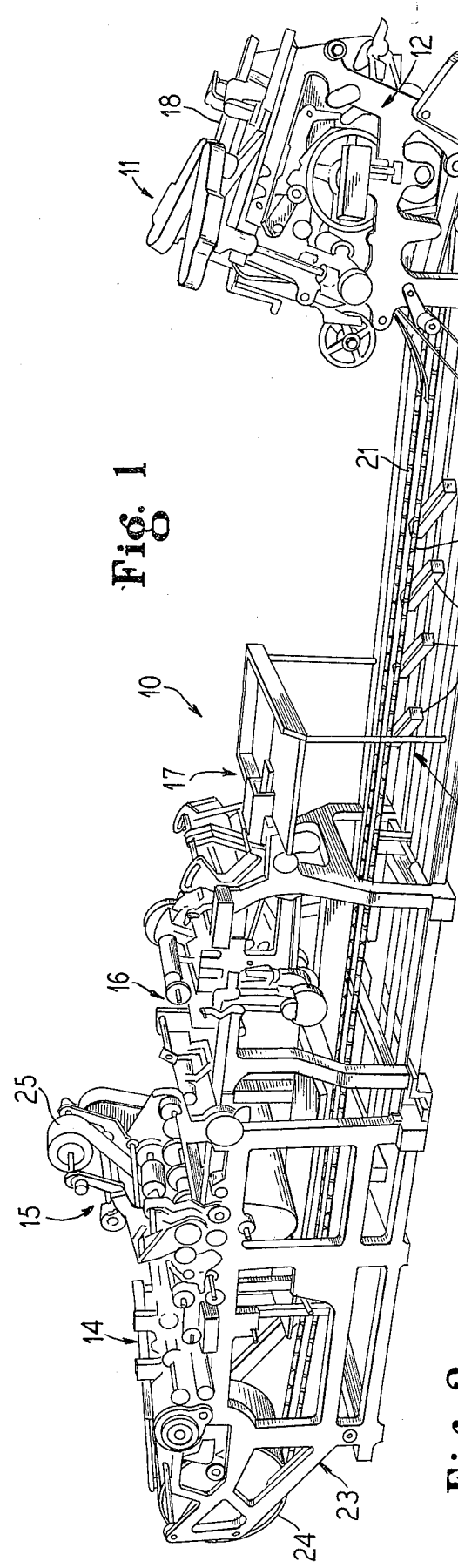
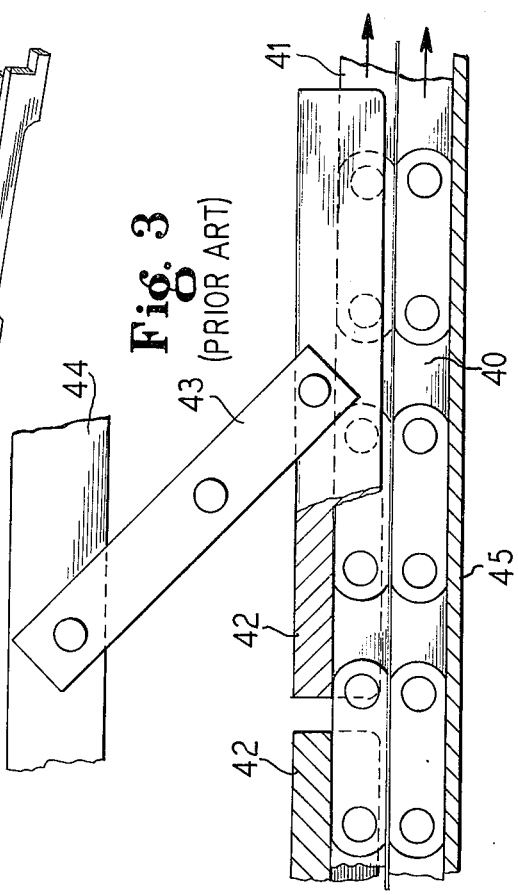
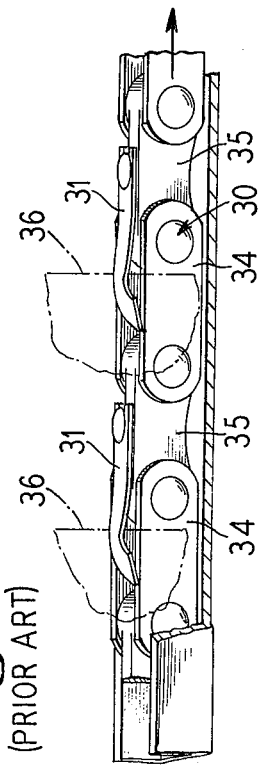
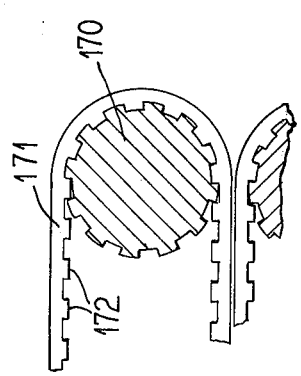
Fig. 1
Fig. 2 (PRIOR ART)
Fig. 3 (PRIOR ART)
Fig. 9

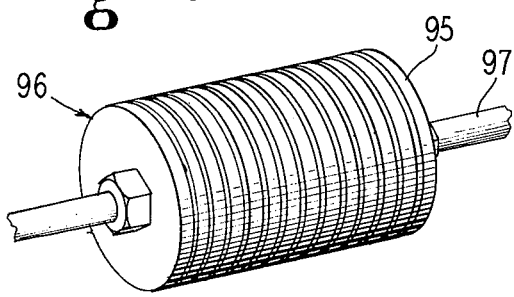
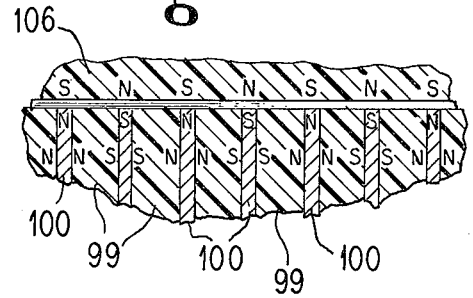
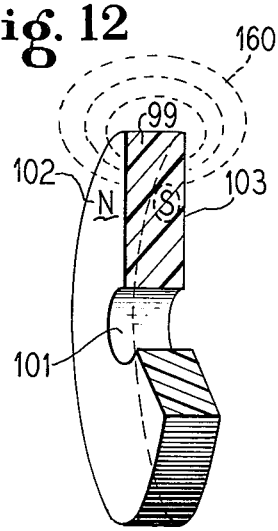
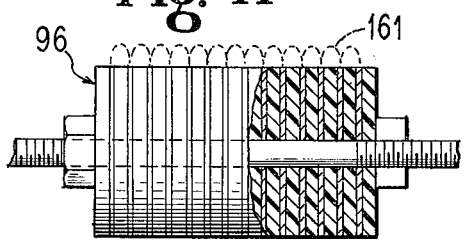
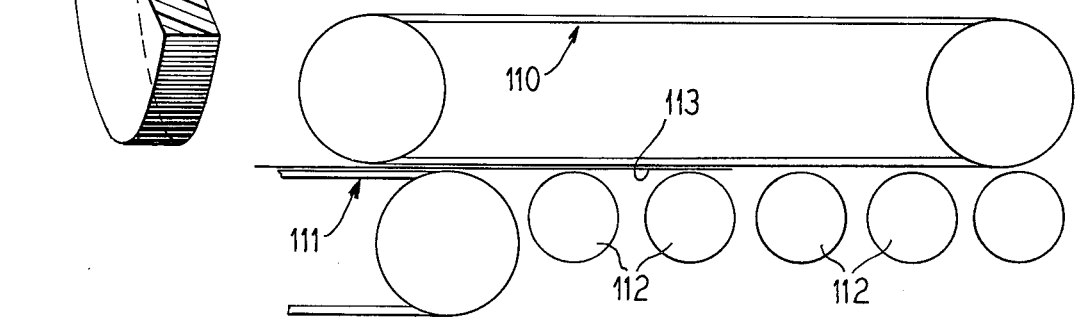
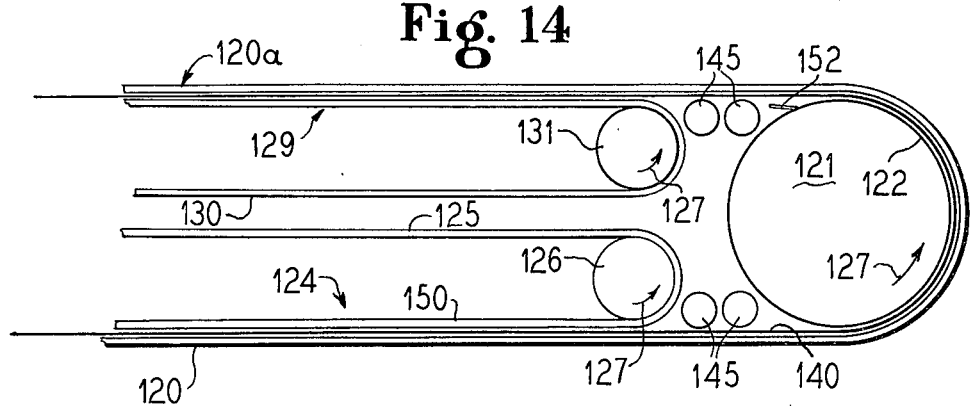

PAPER CONVEYING SYSTEM

BACKGROUND OF THE INVENTION

1. Field of the Invention

This invention relates to conveyor systems and more particularly to a magnetic conveyor system.

2. Description of the Prior Art

Envelope machines which transform cut paper blanks into finished envelopes require conveyor systems for transporting the envelope blanks from one portion of the machine to another. These conveyor systems must be capable of gripping the blank and holding it in proper alignment during the transport thereof. In addition, the longest conveyor reaches extends from the feeder section of the machine which generally includes an adhesive applying section for applying the closure flap adhesive, through a dryer section to an envelope forming section. Due to the necessity of thoroughly drying the closure flap adhesive before allowing that adhesive to come into contact with other surfaces, the transport from the adhesive applying section is along a relatively long path. However, during transport, it is necessary that the blank be firmly gripped to be carried along at the full machine speed while at the same time maintaining alignment of the blanks with respect to the machine.

Such transport has normally been carried out through the use of endless chain conveyors which either have gripping members which individually grip the paper or are biased into firm pressure engagement with one another with the paper entrapped therebetween. Such chains are extremely expensive while at the same time being subject to wear and breakage. When a given length of the chain has worn and is in need of replacement, it is a time intensive task to replace the link. Additionally, when the link is replaced, the resultant chain, due to looseness between other links, may have a different overall length than initially. More importantly, since the paper is usually gripped by two chains, one on each side of the paper so as to leave the adhesive applied flap free of contact, it is possible that the chains will achieve different lengths. Since the links of the chain will not be consistent, but will vary throughout the entire length of the chain due to looseness or tightness between adjacent links and the tensions applied thereto, it is possible for different sections of the chains to be moving at different relative speeds sufficient to misalign the blanks between the parallel running chains.

Of course should one of the links break before replacement, the maintenance task of repairing and replacing that chain is quite complicated. In addition, such chains are extremely heavy and require undesirably large energy expenditures to move them.

While other transport devices, such as driven rollers and the like have been used, the necessity of firmly gripping each blank and of maintaining it in alignment without contacting the gummed area of the blank has required that such alternative transport devices be extremely complex and expensive.

Although it is known to use magnetism in connection with transport devices, such uses have either relied upon use of electromagnets to energize ferrous armatures which will move conveyor bllt backing plates (see for example U.S. Pat. No. 3,227,344 to Rutter) or they have involved the use of permanent magnets mounted on a surface for attracting and holding on the surface metallic members, (see for example U.S. Pat. No. 2,958,019 to Scholten). It has also been known to utilize electromagnets disposed underneath a conveyor to attract metallic objects to be carried into contact with the conveyor surface (see U.S. Pat. No. 3,199,654 to Buccicone). In addition, it has been known to impart an electrostatic charge to a sheet of paper to cause the paper to adhere to a specially constructed conveyor tape (see U.S. Pat. No. 3,761,074 to Benbenek). Each of the prior art magnetic force utilizing transport systems has particular advantages and disadvantages. Among the disadvantages are the inability to transport non-magnetic devices or non-charged devices in those systems which utilize either permanent magnet coatings to the conveying surface or magnetic underlayments or electrostatic chargers. Particularly, devices which rely upon applying an electrostatic charge to the paper are undersirable in high speed machinery because of the difficulty of totally eliminating the electrostatic charge at the desired point. Once the charge has been applied to moving paper, that charge has a tendency to remain with the paper and will cause the paper to move improperly through other parts of the machinery and will further cause the paper to adhere to similar charged papers.

However, a chief advantage of the use of magnetism in transporting devices is the ability to eliminate heretofore complex mechanical grasping means or the prior used opposed weight devices or other types of pressure applying constructions.

It would therefore be an advance in the art to provide a magnetic transport system for moving non-metallic sheets wherein the magnetic force is utilized to hold the sheets in place in the conveyor system without applying a charge to the sheets.

SUMMARY OF THE INVENTION

My invention provides such a magnetic transport system. The invention utilizes opposed moving surface transport members with the members having permanent magnet capabilities with the magnetic poles aligned on the opposed surfaces such that the north and sough poles alternate across the width of the surfaces traverse the direction of travel of the conveyed article.

The magnetic poles of the opposed surfaces are arranged such that the surfaces are attracted to one another to entrap the sheet material therebetween. In addition the strength of the magnetic fields is maintained small enough so that there is not a significant force required to separate the opposed sufaces. However the magnetic field strength is sufficiently strong to maintain a degree of contact between the surfaces and the sheet material sufficient to prevent movement of the sheet material independently of the surfaces.

In a preferred embodiment illustrated, the transport system involves the use of opposed conveyors each of which is constructed of an endless belt suspended around and between movable sheaves, with one length of the belt between its supporting sheaves being opposed to a length of the other belt between its sheaves, the belts moving around their sheaves so that the opposed lengths move in the same direction. The sheaves are placed sufficiently close together so that the belts will normally contact one another as a result of their magnetic attraction.

In an alternative embodiment, one of the conveyor belts is at least partially replaced with a rotating cylinder like roller constructed of alternating magnetic disks and non-magnetic disks.

I have found that such a system works particularly well in transporting paper, and in particular in transporting paper blanks in environments such as envelope manufacturing machines. In such a construction, two sets of opposed belt conveyor systems are used to receive and grasp the paper blanks alongside edges thereof leaving the intermediate portion freely suspended between the conveyor sets in such a manner that the adhesive coated closure flap will not contact any of the elements of the machine and will be free to dry as it passed through the heated drying section.

It is therefore an object of this invention to provide an improved transport system for moving non-ferrous sheets.

It is another and more particular object of this invention to provide a transport system for moving paper sheets by inserting the sheets between two opposed moving surfaces which are at least partially formed of materials having permanent magnet properties, the surfaces being attracted to one another whereby they will grip the paper therebetween.

It is another and more particular object of this invention to provide a paper transport system comprised of opposed aligned endless conveyors, the conveyors being constructed of flexible permanent magnet strips which are attracted to one another and contactable over a length of the conveyors to grasp a sheet of paper received therebetween for movement therewith, the strips having the magnetic poles thereof alternating across the width of the strip tranverse to the movement of the conveyor.

It is again another important and particular object of this invention to provide a paper transport system utilizing opposed magnetic moving surfaces disposed so as to be attracted to one another and entrap a sheet of paper therebetween for movement therewith.

Other objects, features and advantages of the invention will be readily apparent from the following description of a preferred embodiment thereof, taken in conjuction with the accompanying drawings, although variations and modifications may be effected without departing from the spirit and scope of the novel concepts of the disclosure, and in which:

BRIEF DESCRIPTION OF THE DRAWINGS

FIG. 1 is a perspective view of an envelope machine.

FIG. 2 is a fragmentary perspective view with portions broken away of a prior art paper grasping chain used in envelope machines.

FIG. 3 is a view similar to FIG. 2 illustrating another prior art paper moving system used in envelope machines.

FIG. 9 (on page 1 of the drawings) is a fragmentary view similar to FIG. 5 illustrating a modified form of this invention.

FIG. 10 is a perspective view of a magnetic roller according to this invention.

FIG. 11 is a cross sectional view of the roller of FIG. 10.

FIG. 11a is an enlarge partial view of the roller of FIG. 11.

FIG. 12 is a sectional view of one of the magnetic disks of the roller of FIGS. 10 and 11.

FIGS. 13 and 14 are simplified diagramatic views of combined conveyor and roller transport assemblies.

DESCRIPTION OF THE PREFERRED EMBODIMENTS

Figure 4:
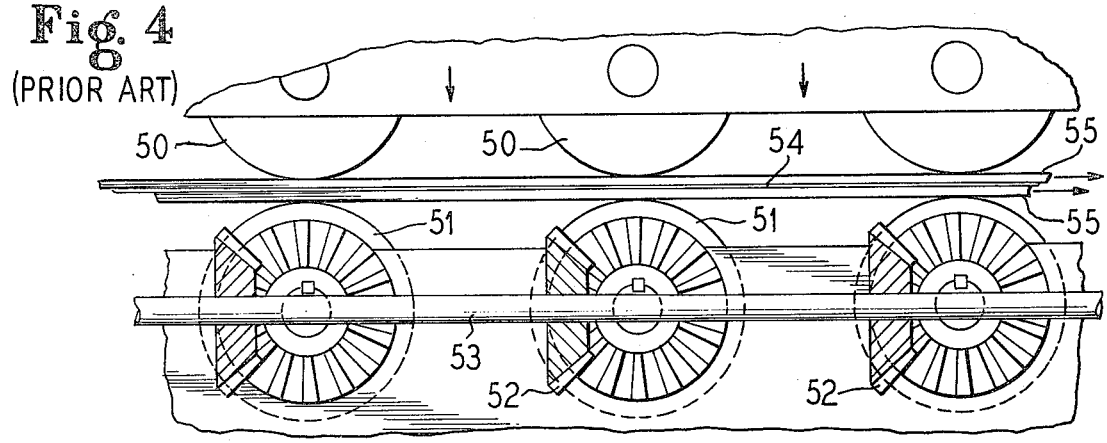
FIG. 4 is a view similar to FIGS. 2 and 3 illustrating yet another prior art method of moving paper in an envelope machine.

FIG. 1 illustrates an envelope machine 10 such as in general use in the industry today. The machine includes a feeder 11, a closure flap adhesive applying section 12, a drying section 13, an aligner section 14, a window forming and gluing section 15, a folder section 16 and a delivery table 17.

In use, the envelope blanks are inserted into the feeder which feeds them into the closure flap adhesive applying section which applies a dryable adhesive to the closure flap. As is common in the art, the envelope blank has a width considerably wider than the closure flap and the adhesive is therefore only applied across the central portion of the width of the entire blank. The adhesive is applied wet and must thereafter be dried before the blank can be worked upon by the machinery inasmuch as any contact between the wet adhesive and the machinery will cause the adhesive to smear and the paper blank to stick to the machinery parts. In order to accomplish drying, the envelope blank is moved from the closure flap adhesive applying section 12 through a drying section wherein heater devices 19, such as heating lights, will evaporate the moisture content of the adhesive. During this movement through the drying section 13, the envelope blanks are suspended between two parallel transport systems 20 and 21. In order to reduce the overall length of the machine, the drying section is normally located underneath other operating portions of the machine. At the outlet end 23 of the drying section, the envelope blanks are moved over a large roller drum 24 into the aligning section 14. Once in the aligning section, the envelope blanks are acted upon by rotating dies and the like to be creased for folding. In addition a central section may be cut out and the borders thereof provided with glue and a transparent window applied from a roll of transparent film 25. After the envelope blank has been fully creased, it is moved into a folding section 16 where, due to the provision of adhesive at appropriate points, the envelope will be folded and fully formed for delivery to the delivery table 17.

My invention concerns itself primarily with the movement of the paper blank from the closure flap adhesive applying section 12 to the aligning section 14. During the transport of the blank between these two sections and through the dryer section, it is necessary that the blank be firmly grasped on both sides of the aadhesive coated closure flap. In addition, it is necessary that the conveyor means that grasp it on both sides move at the same speed so as to not cock the blank with respect to the machine or to other blanks. Since the central section of the blank must be left freely suspended and out of contact with any of the portions of the machine in order to insure proper drying of the closure flap adhesive, prior art devices for moving the paper have been quite expensive.

One such prior device is illustrated in FIG. 2 and consists of a linked chain 30 with grabbing fingers 31 attached thereto. As the chain passes over a sheave, the fingers will lift away from the links 34 to which the fingers are not attached because of the bending of those links with respect to the links 35 to which the fingers are attached. When in such a lifted position, an edge 36 of a sheet of paper, such as the envelope blank, can be interposed between a surface of the links 34 and the undersurface of the fingers 31. Thereafter as the chain becomes linear, the fingers will entrap the paper between the undersurface of the finger and the surface of the links 34. The use of such fingered chains is common in the industry for transport through the dryer section. Such fingered chains are quite expensive often costing in excess of $20.00 a foot. Since envelope machines in normal use today require over 80 feet of chain per machine, the great expense is quite apparent. In addition, since mechanical linkage chains must be used, the weight of the transport section is undesirably large and the amount of power expended in moving the paper and the chains through the section is considerable. In addition, chains present maintenance and replacement problems.

FIG. 3 illustrates another prior art method of moving the paper blanks. In this construction opposed chain conveyors consisting of two opposed chains 40 and 41 are provided. The paper blanks are received between the chains and in order to insure that the paper is firmly grasped, weights 42 ride on the outside surfaces of the upward chain. In addition, the weights may be spring urged against the chain. In order to prevent the weights from moving, pivotable linkage arms 43 attached to the machinery base 44 are in turn attached to each of the weights 42. The chain 40 opposite the weight associated chain must then be backed against a supporting surface 45. While such devices work effectively, the friction generated by moving the chains against the support surface 45 and the weights 42 is excessive and again requires the application of a high degree of energy input to the transport system. This friction cannot be eliminated through lubrication because of the effect of the lubrication would have on the paper blanks. Additionally, although such common linked chains are less expensive than the chains illustrated in FIG. 2, they still average approximately $10.00 per foot thus resulting in a large expenditure for the system. Once again maintenance and replacement problems are encountered.

FIG. 4 illustrates yet another prior art embodiment of a transport system. This transport system utilizes opposed rollers 50 and 51 with the rollers 51 being driven by means of gearing 52 from a common shaft 53. In such embodiments, the paper blanks 54 may be entrapped between the rollers or, as is more common, conveyor belts 55 are provided between the rollers with the paper entrapped between the conveyors. The use of the conveyors insures that the paper blanks will not fall between the rollers. Such transport systems, although requiring less energy than the chains because of the absence of friction, are considerably more expensive initially, add a great deal of unwanted weight to the machine and employ and undesirably large amount of gearing.

Figure 5:
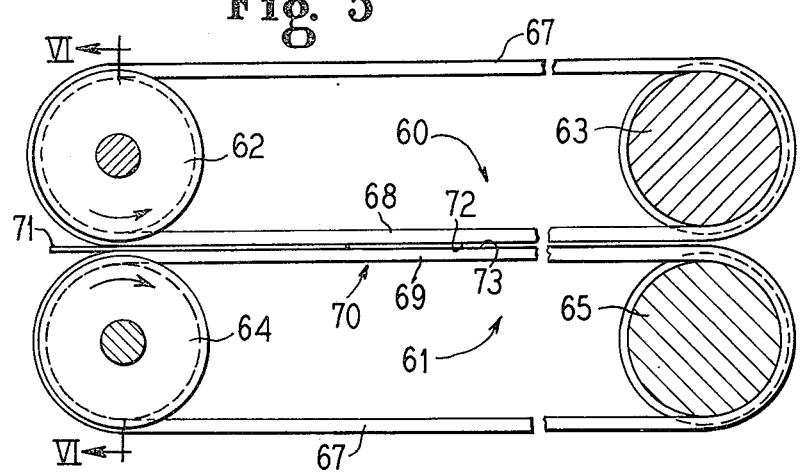
FIG. 5 is a simplified diagramatic view of the paper conveyor of this invention.
Figure 6:
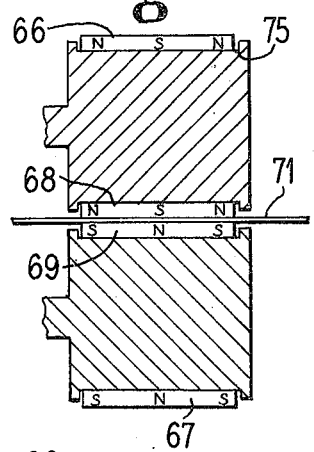
FIG. 6 is a cross sectional view taken along the lines VI—VI of FIG. 5.

FIGS. 5 and 6 show, in a simplified embodiment, the transport mechanism of this invention. The transport consists of two endless strip conveyor systems 60 and 61 each of which consists of at least two sheave wheels 62 through 65, the sheave wheels of each conveyor system being positioned at axial parallel spaced apart relationship with each of the sheave wheels being rotatable and at least one driven by connection to a motive source (not shown). Endless strips 66 and 67 are provided for each conveyor system, the strips being received around the associated sheave wheels and spanning the distance therebetween. The sheave wheels of each conveyor system are aligned axially parallel to the sheave wheels of the other conveyor system and are disposed in aligned planes and positioned with respect to one another whereby lengths 68 and 69 of the strips spanning the distance between their associated sheave wheels 62, 63 and 64, 65 are closely positioned to one another and are opposed to one another as illustrated at 70. The sheave wheels are positioned sufficiently far apart so that a paper sheet 71 can be received therebetween and be contacted by the opposed surfaces 72, 73 of the lengths 68, 69.

The strips are formed of flexible permanent magnet material. This material is generally constructed of a composition of rubber and barium ferrite powder and is preferably of the type wherein the magnetic flux lines in the barium ferrite filler have been oriented to provide a series of alternating N and S poles across the width of the strip. Such strips are commercially available and include products manufactured under the trademark PLASTIFORM by the Industrial Electric Products Division of 3M Company.

According to my invention, these strips are formed into endless belt strips with the magnetic poles alternating across the width of the strips transverse to the direction of movement of the strip. As illustrated in FIG. 6, such strips are arranged with the north (N) and south (S) poles alternating across the width of the strip. Preferably the aligned belts 66 and 67 have their alternating poles staggered from one another so that the imposed lengths 68 and 69 will have opposed poles facing one another at the surfaces 72, 73. In this manner, the strips will be attracted to one another and will thus firmly grip the paper strips 71. Whenever in this specification and the claims appended herto I have used the phrase "flexible permanent magnet material" it is to be understood that I am referring to that class of material constructed of a flexible composition having ferrous material therein which is magnetized into lines of substantially continuous alternating polarity, the ferrous material being of small particle size so as to not substantially interfere with the flexibility of the overall material, substantially as described above.

It should be noted, that as shown in FIG. 6, the sheaves can be centrally depressed as at 75 to receive the strips 66, 67 to maintain them generally in alignment. One of the unique features of using strips with alternating poles spaced traversely of the length of the strip is that the strip themselves are generally self-aligning in that only the opposed poles are attracted. By providing spacing between the poles transverse the direction of movement of the strip, the strips will naturally attract in the correct aligned condition.

By closely spacing the opposed sheaves, such as the entrance sheaves 62 and 64 shown in FIG. 5 so as to provide clearance for the paper 71, the rows of magnetic poles running the length of the strip and being spaced from one another across the width of the strip will cause the opposed lengths 68 and 69 of the strips to contact one another closely adjacent the sheaves 62, 64 and to be in correct common edge plane alignment. Because the alignment is created by the magnetic attraction of one strip to the other, it will be maintained for the travel length between the sheaves 62, 63 – 64, 65.

By utilizing a magnetic field having a sufficent strength, it is assured that the paper will be fully grasped between the opposed strips and carried therewith. Because the magnetic attraction has the ability to pass through the paper, the strips will be urged into tight gripping engagement with both sides of the paper. In addition of course, those portions of the strip in intermediate successive strips of paper will be in full engagement with one another.

However it is to be appreciated that one of the important features of this invention is the ability to use relatively small strength magnetic fields. Because the poles continue the entire length of the strip, the actual force holding the paper in position is the attraction strength of the strips for the entire length of the paper. Thus the attraction strength at any given cross section of the strips may be quite small so as to allow the strips to be very easily peeled apart at the sheaves 63, 65 while maintaining a very high strength grip on the sheets of paper intermediate the sheaves.

Figure 7:
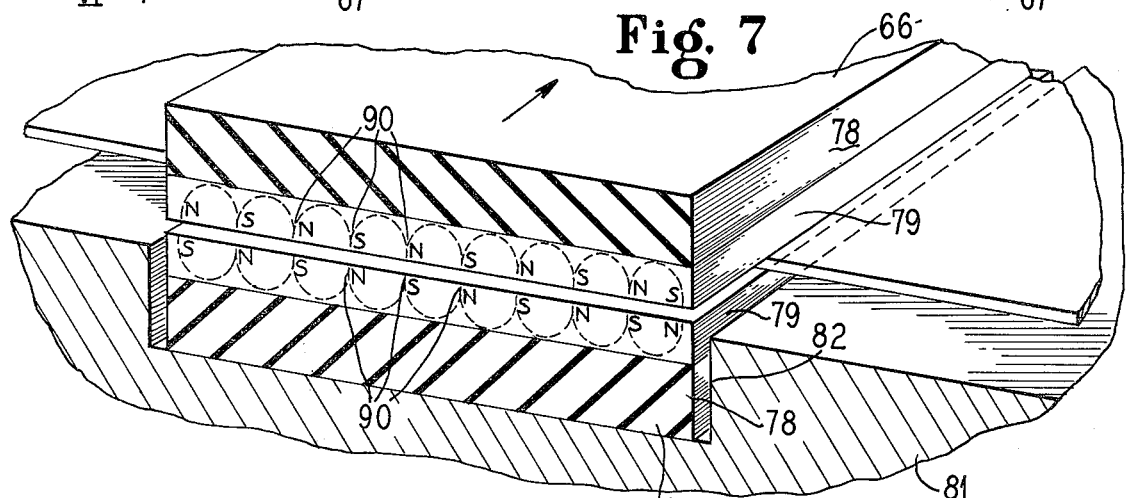
FIG. 7 is a fragmentary perspective and sectional view of the paper conveying assembly according to this invention.
Figure 8:
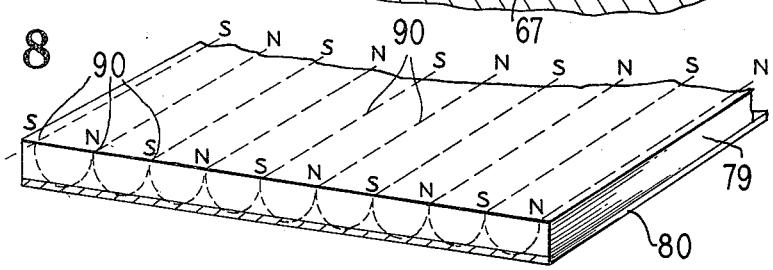
FIG. 8 is a fragmentary perspective sectional view of a modified form of the magnetic strip of this invention.

As is shown in FIG. 7, the individual strips 66, 67 preferably consist of two layers 78 and 79 with the flexible permanent magnet strip comprising the layers 79 which are backed by backing layers 78. The backing layers may be constructed of conveyor belting material, rubber, or the like and serve to give strength to the permanent magnet strips 79. FIG. 8 illustrates a modification wherein the permanent magnet strip 79 with or without the backing strip 78 is in turn further backed by a spring steel strip 80. Also as shown in FIG. 7, if desired the machine on which the transport system is used may have a rigid backing 81 with a groove 82 therein in which the strip 66 or 67 is received.

As indicated in FIGS. 7 and 8, preferably a plurality of pole lines 90 are provided on each of the surfaces of the strip 79. It is to be noted that as illustrated in FIG. 8, the poles run continuously the length of the strip.

Although it is possible to create a strip having a large number of pole lines, I have found that preferably the poles should be placed no closer than one-eighth of an inch apart transverse the strip. The reason for this is to insure that the strips will be self-aligning with associated strips as they come into opposition with one another at the sheave wheels. The reason for the spring steel backing 80 in FIG. 8 is to give increased strength and wearability to the conveyor inasmuch as the flexible permanent magnet material presently available does not generally have sufficient wear qualities for independent long term use as a conveyor.

FIG. 10 illustrates a modified form of the invention wherein the magnetic conveyor consists of a stack 95 of disks 96 received around a central axle 97. The disks are of two types, those having a magnetic charge 99 and ferrous spacer disks 100. As is illustrated in FIG. 10, the disks 99 comprise flat disks having a central aperture 101. The disks may again be constructed of a combination of rubber or other elastomeric material filled with barium ferrite. These disks normally are permanently charged to function as permanent magnets with a north pole on one face of the disk 102 and a south pole on the opposite face 103. By alternating the disks with metallic washers or disks and by reversing the disks 99 so that adjacent disks present faces of a like magnetic pole to one another spaced apart by the non-charged disk 100, the resultant stack will have an outer diameter magnetic polarity with the polarism centered at the center of the non-charged spacing disks. In this manner, for example if two N poled fields are placed in contact with opposite sides of a non-charged ferrous disk, that disk will then have a N polar charge evidenced around its periphery. Thus by reversing the charged disks and spacing them with the non-charged disks the periphery of the resultant stack 95 will be charged with alternate poles in somewhat the same manner as the surface of the aforementioned conveyor strips.

By then opposing the stack 95 with a conveyor strip such as illustrated at 106 of FIG. 11a, and by spacing the poles of the strip 106 the same as the stack 95, substantially the same attractive effect can be created between the strip and the stack has been previously described between opposed strips.

Since disks such as that shown in FIG. 12 are commerically available with diameters as small as 1½ inches and thicknesses of one-eight of an inch, it can be seen that such stacks can be readily used either individually in opposition to a conveyor or as a group of parallel rollers in oppostion to a conveyor.

FIG. 13 illustrates such system utilizing both opposed conveyor systems 110 and 111 and charged rollers 112 constructed according in the manner of the stack 95 of FIG. 10. In the embodiment illustrated in FIG. 13, the conveyor system 110 extends beyond the end of the conveyor system 111 and the rollers 112 are placed under the conveyor system 110 beyond the end of the conveyor system 111. A paper strip is illustrated at 113 to show that, due to the small diameter of the rollers, the paper strip or envelope blank will normally be considerably longer than the diameter of the rollers and in this manner, it is assured that the paper blank will continue to be entrapped between the conveyor strip and the rollers and will not have a tendency to fall between the rollers.

FIG. 14 illustrates another embodiment making use of both opposed conveyor strips and rollers and the use of a magnetically charged conveyor strip in connection with a metallic drum.

In FIG. 14, a first conveyor strip 120 is provided which is received around a drum 121 having a metallic surface 122. The drum may form one end of a conveyor system 120a with the drum 121 serving as one sheave. A second conveyor system 124 consisting of a strip 125 and associated sheaves 126 (only one of which is shown) overlies one length of the strip 120 upstream of the roller 121, upstream being determined by the direction of the rotational arrows 127. A third conveyor system 129 consists of a conveyor strip 130 and associated sheaves 131 (only one of which is shown). This strip is located downstream of the drum 121. A continuous line 140 illustrates a sheet of paper or a stream of individual paper blanks being moved by the system. Magnetic surface stacks 145 are interposed between the sheave 126 and the drum 121 and between the drum 121 and the sheave 131. These stacks are rotated in the same direction as the sheaves 127 and 131 and the drum 121.

This system serves to transport the paper through a reverse path while maintaining it in constantly gripped relationship. The conveyor system 124 has one length thereof 150 attracted to the strip 120 and will grip the paper 140 therebetween. As the paper passes beyond the sheave 126 which must be spaced from the drum 121 in order to provide clearance for the relatively large diameter sheave 127, the paper will pass between the strip 120 and the magnetic surface stacks 145 to continue the gripping. Because the stacks have a fairly small diameter, they can be placed reasonably close to the surface of the drum. Thereafter, because of the metallic surface of the drum, the strip 120 will be attracted to it and will entrap the paper sheet 140 between itself and this surface 122 of the drum. After the paper sheet 140 is moved around half the circumference of the drum a deflector member in the manner of a doctor knife 152 will direct the paper to the magnetic surface stacks 145 on the top side of the drum. These in turn will grip the paper between themselves and the strip 120. The paper will then pass into the opening at the sheave wheel 131 and be gripped between the conveyor system 129 and the strip 120.

It is to be understood that FIGS. 5, 13 and 14 illustrate only basic systems variations which are possible utilizing the opposed charged conveyor strips and the charged surface rollers of this invention and that other systems are not only possible but clearly envisioned. One such possible system can use opposed stacks 95 with one stack movable towards the other. Another system can utilize much longer conveyors than illustrated with associated rollers for moving the conveyors about an angle to change the direction of movement of the entrapped paper or other non-metallic sheet material.

It will be further appreciated that although the flux lines 160 of the disks 99 normally flow around the periphery from the one face to the other, that by combining them in the stack 95 with alternating reversed polarity and interposing ferrous washers the flux lines will flow between adjacent permanent magnetic disks and will be concentrated at the outer periphery as illustrated in FIG. 11 at 161.

In addition, although I have described the opposed conveyors as utilizing sheaves it is to be understood that other types of end rollers could be utilized as is standard in the conveyor industry. As an example in FIG. 9 I have shown the use of a cogged sheave or roller 170 used in connection with a strip 171 having a toothed undersurface 172 which cooperates with the roller 170 in the manner of a timing belt. This embodiment is especially advantageous where the strips are relatively long and it is necessary to drive parallel strips at identical speeds without slippage as in the embodiment of FIG. 1 where the total travel between the adhesive applying section and the aligning section through the drying section may be in excess of 20 feet.

Although the teachings of my invention have herein been discussed with reference to specific theories and embodiments, it is to be understood that these are by way of illustration only and that others may wish to utilize my invention in different designs or applications.

I claim as my invention:

1. A device for conveying sheets of non-magnetic material which comprises a pair of opposed moving surfaces contactable with one another, the surfaces moving at a plane of contact in the same direction, each of the surfaces comprising a plurality of magnetic fields exhibiting lines of polarity extending in the direction of movement of the surfaces at the plane of contact, the lines of polarity alternating N and S poles across the surfaces transverse the direction of movement of the surfaces at the plane of contact and the lines of polarity opposed to one another whereby the surfaces are magnetically attracted to one another and will grip a sheet of non-magnetic material therebetween for movement with the surfaces wherein at least one of the opposed surfaces comprises the outer diameter surface of a roller and wherein the roller comprises a stack of disks, the disks alternating permanent magnet disks and non-permanent magnet disks, the permanent magnet disks having opposite poles on opposite radial faces and the permanent magnet disks being alternately reversed with like poles contacting opposite radial faces of a common non-permanent magnet disk received therebetween.

2. A device for conveying sheets of non-magnetic material which comprises a pair of opposed moveable surfaces of small particle size ferrous permanent magnetic material contactable with one another, the surfaces moving at a plane of contact in the same direction, each of said surfaces comprising a plurality of magnetic fields exhibiting a plurality of sets of of continuous parallel lines of N and S polarity extending in a direction of movement of the surfaces across the widths of the surfaces at the plane of contact, the lines of polarity alternating a plurality of spaced N and S parallel poles across the surfaces transversely of the direction of movement of the surfaces at the plane of contact, and the polarity of the individual lines of polarity of one surface opposed to opposite polarity lines of polarity of another of the surfaces whereby the surfaces are magnetically attracted to one another in parallel relation along said plane of contact and will grip a sheet of non-magnetic material therebetween for movement with the surfaces.

3. In an envelope machine having an envelope blank feed station spaced from a blank folding station with a blank transport means therebetween, the improvement of at least part of the blank transport means comprising upper and lower endless conveyor strips of small particle size ferrous flexible permanent magnet material, the strips being vertically aligned and contactable with one another over a portion their length, means for inserting a blank between the strips with opposed lengths of the upper and lower strips contacting opposite sides of the blank for transport of the blank by movement of the strips, said strips having a plurality of sets of continuous parallel N and S magnetic poles across the widths of the strips and extending lengthwise of the strips with their N and S poles alternating in contiguous relation across the widths of the strip whereby the opposed lengths of the upper and lower strips will be magnetically attracted with opposite poles of each strip in alignment to hold the strips in aligned relation.

4. A paper transport assembly comprising first and second endless strip conveyors of small particle size ferrous flexible permanent magnet material, a plurality of sheaves rotatably mounted on parallel axes in spaced relation receiving said endless strip conveyors therearound, the sheaves for the first conveyor being positioned with respects to the sheaves for the second conveyor to direct outer surfaces of the first and second conveyors into opposed contactable relation for at least a portion of the distance between the spaced sheaves of each conveyor strip, said permanent magnet material strips having continuous parallel magnetic poles arranged lengthwise thereof with the poles alternating across the widths of the strips transversely of the direction of movement of the strips and with each strip having a plurality of sets of N and S poles.

5. The device of claim 2 wherein at least one of the opposed moving surfaces is the periphery of a roller.

6. The device of claim 2 wherein at least one of the opposed moving surfaces is an endless flexible strip trained around spaced sheaves having depressed central portions receiving and centering the strip.

7. The device of claim 2 wherein the alternate N and S parallel poles are spaced not less than 1/8 inch transversely of the surfaces.

8. The device of claim 1 wherein the other opposed surface is provided by an endless belt of flexible magnetic material.

9. The device of claim 8 wherein the endless belt of flexible magnetic material has a second endless belt of flexible magnetic material inside one of the runs of the first mentioned belt adjacent the roller and with lines of polarity extending along the length of the second belt and across the width thereof for alignment with lines of polarity of the first mentioned belt.

* * * * *